United States Patent [19]

Falcone

[11] Patent Number: 4,749,161
[45] Date of Patent: Jun. 7, 1988

[54] AUTOMOBILE STEERING WHEEL TABLE

[76] Inventor: Gus Falcone, 76 Schultanhan St., Lido Beach, N.Y. 11561

[21] Appl. No.: 36,120

[22] Filed: Apr. 9, 1987

[51] Int. Cl.$^4$ ............................................. A47B 97/08
[52] U.S. Cl. .................................. 248/447.2; 248/459; 108/44
[58] Field of Search ................ 248/447.1, 447.2, 459, 248/460; 108/44, 42; 224/276, 277

[56] References Cited

U.S. PATENT DOCUMENTS

| | | | |
|---|---|---|---|
| 1,883,714 | 10/1932 | Gray | 248/447.2 X |
| 2,746,821 | 5/1956 | Schroeder | 108/44 |
| 2,749,655 | 6/1956 | Ashton | 248/447.2 |
| 3,643,606 | 2/1972 | Vise | 108/44 |
| 3,804,031 | 4/1974 | Pitts | 108/44 |

FOREIGN PATENT DOCUMENTS

| | | | |
|---|---|---|---|
| 552891 | 2/1958 | Canada | 108/44 |
| 1550899 | 8/1979 | United Kingdom | 108/44 |
| 2025212 | 1/1980 | United Kingdom | 108/44 |
| 2144627 | 3/1985 | United Kingdom | 108/44 |

*Primary Examiner*—Ramon S. Britts
*Assistant Examiner*—Karen J. Chotkowski
*Attorney, Agent, or Firm*—Murray Schaffer

[57] ABSTRACT

A pair of panel sections are arranged flat against the surface of the steering wheel, hingedly connected to each other to enable the panels to fold from a flat position to a position overlying each other. A depending side section is hinged to the outer lateral side edge of one of said panel sections to fold with respect thereto between a position overlying the one panel section and a position depending vertically therefrom. A table section is hinged to the lower edge of the depending side section to be foldable between a position overlying said depending side section and a position extending horizontally outwardly therefrom.

6 Claims, 2 Drawing Sheets

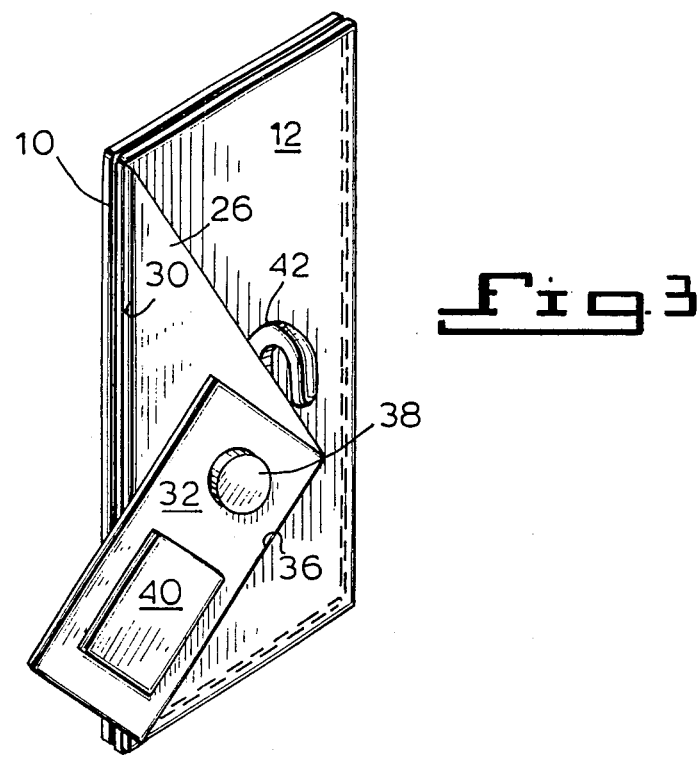
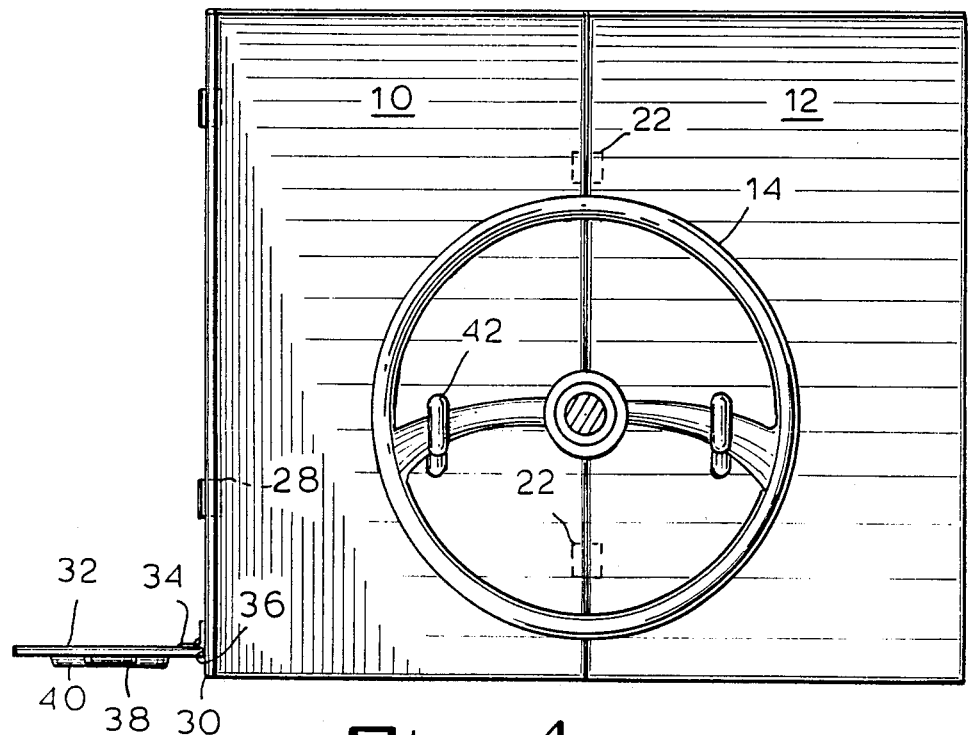

AUTOMOBILE STEERING WHEEL TABLE

BACKGROUND OF THE INVENTION

The present invention relates to a portable, foldable, and easily erectable stand for use in conjunction with the steering wheel of an automobile or other vehicle.

Frequently, drivers have a need for, or a desire, to rest, drink a cup of coffee, or read a map or newspaper while being confined behind the wheel of a parked automobile, finding it extremely inconvenient, to leave that position, to find a support or table, or to sit in another seat of the vehicle. Consequently, there is need for such a table to be used when the automobile is in the parked condition, which will enable the user to more easily read a newspaper or book while simultaneously having a cup of coffee or sandwich.

A number of temporary tables and desk top surfaces have been proposed for use with vehicular steering wheels. For example, in U.S. Pat. Nos. Gray 1,883,714, and Russell, 4,453,788, box-like attache cases are provided having hooks which can be set over the steering wheel. Each of the boxes is openable to expose the contents thereof, but must be closed in order that it be useable as a table-like surface. In any event, both patents disclose surfaces which are smooth and in the manner they are mounted on the vehicle wheel, are maintained wholey inclined to the horizontal so that it cannot be used as a table surface on which papers, cups, plates or the like can be stably held. In Shroeder, U.S. Pat. No. 2,746,821, a purely horizontal shelf is attachable to the steering wheel. The shelf protrudes forwardly in a horizontal manner in front of the driver thus having severely limited space restrictions on which papers, books, eating utensils or the like, can be placed securely and for most drivers severely restricting their freedom of movement.

Vise, U.S. Pat. No. 3,643,606 provides a support formed of hinge sections adapted so that one section lies flat against the steering wheel, inclined to the horizontal while the other section forms a horizontal shelf extending from the first section toward the driver. The horizontal shelf is in front of the wheel and is not particularly suitable for use while the driver is sitting in his seat, since it interferes with his body movement and provides no room on which to stabily store books, papers, or eating utensils. Furthermore, the means by which the device is hinged to the wheel, does not prevent the device from slipping and sliding and rotating about the center of the wheel and thus it is not a stable support structure.

It is the object of the present invention to provide a foldable, portable and easily erectable stand for use in conjunction with the steering wheel, which overcomes the disadavantages noted above.

It is a more particular object of the present invention, to provide a stable stand for use in conjunction with the steering wheel having ample room between the driver and the steering wheel, yet providing a stable surface on which books, eating utensils and the like can be placed.

It is a further object of the present invention, to provide a multi-part hinged device which is easily foldable into a small dimension so that it is easily stored within the conventional automobile without interfering with the driver or the passengers, while enabling erection so that it provides ample room for use for its intended purposes.

The forgoing objects, together with numerous advantages, will be seen from the following disclosure.

SUMMARY OF THE INVENTION

In accordance with the present invention, a stand is provided for use in combination with the steering wheel, comprising a pair of central panel sections arranged flat against the surface of the steering wheel. Each of the panel sections has an inner lateral side edge hingedly connected to the abutting edge of the other panel side to enable the panels to fold from a flat position against the steering wheel outwardly to a position overlying each other. A depending side section is hingedly connected to the outer side edge of one of the panel sections so as to be also foldable against the back side of one panel. The depending side section folds with respect to the one side panel from a position overlying it to a position depending vertically therefrom. A table section is hingedly connected to the lower edge of the depending side section so as to be itself foldable between the position overlying the depending side section and a position extending horizontally outward therefrom.

As a result of the foregoing construction, a table support, arranged flat against the steering wheel is provided, while at the same time, a wing-like table extends horizontally therefrom, on which a beverage such as a cup of coffee or some refreshments such as a sandwich may be supported. In this manner, the area between the driver and the wheel, continues to be free from any impediment, the inclined table support can be freely used for a book or paper, while at the same time, the wing-like table will safely hold a hot drink or beverage and the refreshment.

Preferably, the central panel sections are each provided with a hinge member which is selectively deformable so as to conform to the particular shapes and sizes of the vehicle's steering wheel, so as to hook over the transverse arms of the steering wheel thereby securely locking the stand, with respect to the steering wheel. Because steering wheels now are conventionally locked when the vehicle engine is turned off, rotation of the stand about the axis of the steering wheel is eliminated.

Preferably, the horizontal wing-like table section is provided with a cut-out or recess for receiving a beverage, cup or container and with a shallow indentation, so as to retain more readily the other refreshment, such as a sandwich.

Preferably, the hinge connections are arranged in the alternate folding manner so that the multi-sections may be foldable to a contiguous stack, thereby rendering it to a smaller size for storage.

Full details of the present invention will be set forth in the following described and will be seen in the attached drawings.

BRIEF DESCRIPTION OF THE DRAWINGS

In the drawings:

FIG. 3 is a view of the stand of the present invention in collapsed condition;

FIG. 4 is a view from the rear of the stand showing the attachment thereof to the steering wheel.

DESCRIPTION OF THE INVENTION

Figure 1:
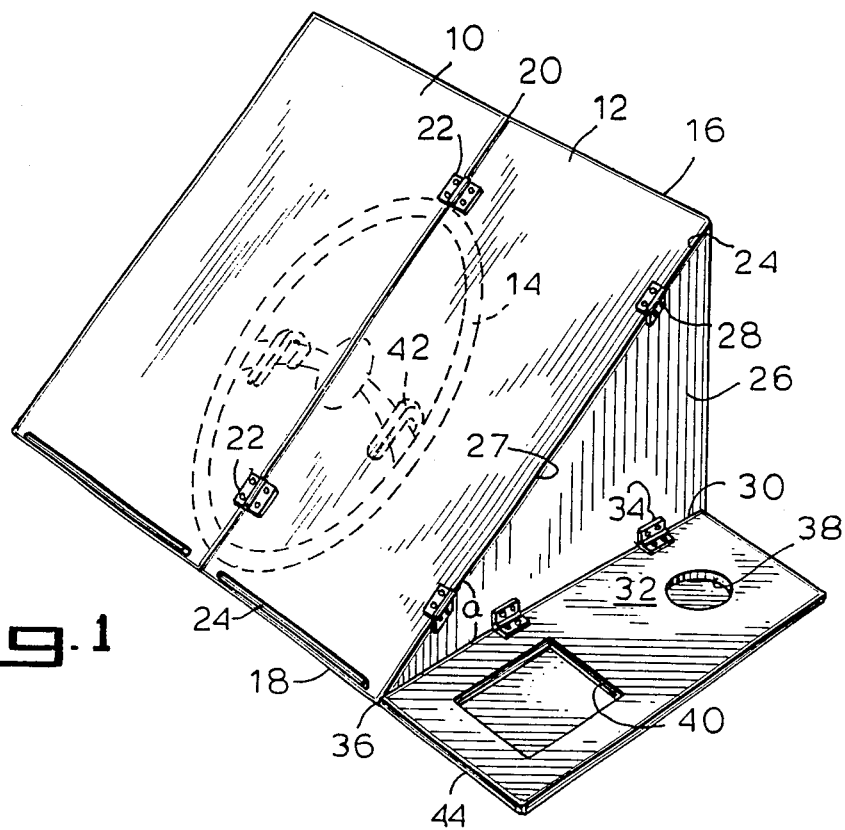
FIG. 1 is a perspective view of the stand embodying the present invention.
Figure 2:
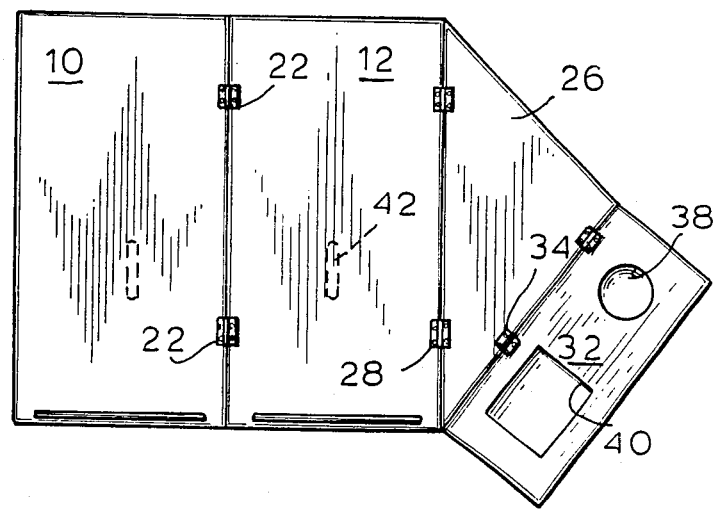
FIG. 2 is a developed view in plan, showing the elements of the stand embodying the present invention.

As seen in the drawings, the support of the present invention comprises a pair of flat central panels 10 and 12 shown preferably as rectangular members, although the size and shape of are not critical and may be selectively chosen to fit the vehicle and intended purposes. In addition, the term "central" implies only that the panels will be ultimately centered, in a substantial manner of the steering wheel 14 of the vehicle, in front of the driver's manual position. The flat panels 10 and 12 are arranged side by side so as to fit flat over the vehicle steering wheel 14 and thereby assume a co-planer extended inclined surface having longitudinal edges 16 and 16 at its top and bottom respectively. The two panels 10 and 12 are joined together along abutting inner lateral side edges 20 by two or more hinges 22. If desired, the lower edge 18 one or both of the panels may be provided with a flange or lip 24 enabling a book, sheet of paper, or newspaper to be held in the inclined position without falling or sliding down.

Attached to the outer lateral side edge 24 of one of the planar panels 10 or 12, is a triangular depending side section 26. The triangular section 26 is in the form of a right triangle with the hypotenuse 29 attached by hinge 28 to the outer lateral side edge 26 panel 12 so as to depend vertically therefrom and have its lower edge 30 extending at an angle thereto, substantially equal to the normal angle of inclination of the steering wheel 14, so that it extends horizontally to the rear. Horizontal table 32 is hingedly connected to the lower edge 30 by hinges 34 which are arranged so that the table member 32 can be swung upwardly against the triangular depending side section 28. As seen from FIG. 3, by placing the hinges 34 slightly above the lower edge 30 of the depending side section, the edge wall 36 of the table member 32 will abut against the frontal face of the depending side section 28 and thereby coact with it to maintain the horizontal position of the table 32 without the need for any supporting braces or side straps, although they too may be used if desired. Set within the table 32 toward its upper edge is a recess 38 into which a cup, container or the like for a hot or cold beverage may be set. Adjacent the lower edge, the table 32 is provided with a recess or an indentation in the shape of a shallow tray 40 into which a sandwich or other food may be placed. The recess may, if desired, be shallow, deep, or even have holes into which containers may be set.

Preferably, the hinges 22, 28 and 34 are placed in alternate position so that their members can fold together accordion fashion forming a stack one on top of the other as seen in FIG. 3. Thus, in storage condition, the stand can be folded into its smallest thickness possible. Simple two leaf plain pintle hinges may be used although if desired, a piano hinge, or other type of leaf hinge may also be used. The hinges 22 are set so that one panel section 10 can be folded over from its co-planar position to overlie co-extensively the other planar section 12 (FIG. 3).

On the back surface of each of the flat panels 10 and 12 there is provided hooks 42 or other fastening means by which the table can be secured over the steering wheel 14. The hooks 42 are preferably formed of malleable or twistable aluminum which retains sufficient rigidity so that once formed to the hook shape they will retained the support on the steering wheel. The hooks 42 enable the device to be accommodated to various style steering wheels without more complex securing means. Since modern automobiles are made with steering wheels that lock in fixed position with horizontal cross bars 44 in substantially horizontal position relative to the access of the steering wheel, the use of simple hooks which are placed over the cross bar is a very preferably form for mounting the stand. If desired, the hooks may be more rigid, they may be pivotably attached to the rear surface of the stand, or they may even be mounted within retaining sockets so as to be removable therefrom when desired.

As will be seen from FIG. 1, once the stand is placed in position over the steering wheel, the central panels 10 and 12 lie flat and co-planar, being parallel to the plane of the steering wheel 14. The side panel 26 hangs dependingly therefrom in a vertical plane and the table member 32 extends horizontally therefrom, the front edge 44 of the table section 32 extends co-planar with the front edge 24 of the central panels 10 and 12. All of the sections become relatively fixed one with the other by the simple hinge means arrangement employed, and further securing means between each of the sections is necessary, even if the extending table is loaded with a beverage, or comestible.

The stand may be made of wood, plastic or even aluminum if that is desired. The question of weight, in the choice of material is not critical, since each of the sections hangs on to each other and all are supported by the steering wheel and the steering column.

It will be seen that no portion of the stand extends forwardly from the wheel toward the driver. As a result, the clearance between the driver and the steering wheel is not shortened, nor is there any impediment, for the driver's free and easy maneuverability behind the steering wheel. Of course, it is not intended that the vehicle be driven with the stand in place over the steering wheel, but the fact that the driver retains his freedom of movement, is of considerable convenience. In addition, the placement of the food to the side of the driver, is if great convenience, since he may use one hand to manipulate the food and the other to manipulate the reading material. The food is off to the side, and should it by chance fall, it will not fall directly on to the driver. Preferably, the table section 32 is attached to the right hand center panel 12 since in the United States, the wheels are generally placed on the left hand side of the car. Of course, should the unit be used on foreign automobiles having the steering wheel on the right side, the relative position of the sections would be reversed.

The foregoing is illustrative of the present invention and should not be taken as limiting of the scope thereof.

What is claimed is:

1. A stand for use in combination with a vehicle steering wheel comprising a pair of central panel sections, each having an inner lateral edge and hinge means connecting said central panel sections contiguously to each other along the inner lateral edges to enable the central panels to fold between a flat extended position to a closed position overlying each other; a side section, hinge means connecting said side section contiguously to the outer lateral side edge of one of said panel sections to fold with respect thereto between a closed position overlying said one panel section and an open position perpendicular to the rear surface therefrom, a table section, hinge means connecting said table section contiguously to the lower edge of said side section to be foldable between a closed position overlying said depending side section and an open position extending outwardly therefrom a hood member attached to the rear surface of each of said panel sections, said hook member being engageable over the respective lateral cross bars of the steering wheel so that when said stand is opened, said panel sections extend transversely to the vehicle flat against the steering wheel with their inner lateral edges extending diametrical to the steering wheel, the axis of the vehicle, said side panels depends vertically from the associated one panel section and the table extends outward horizontally therefrom to enable placement of food and drink and the like thereon.

2. The stand according to claim 1 wherein said table is provided with means for receiving said food and drink.

3. The stand according to claim 1, wherein said hinge means are arranged in alternate folding arrangement so that said panel sections, side section and table section are foldable into a contiguous stack.

4. The stand according to claim 1, wherein said hook members are malleable so as to be formed to fit said steering wheel.

5. The stand according to claim 1, wherein said hook members are pivotably attached on the rear surface of said panel.

6. The stand according to claim 1, including ledge means along the bottom edge of said panel sections.

* * * * *